United States Patent
Kamiya et al.

(10) Patent No.: US 6,905,995 B2
(45) Date of Patent: Jun. 14, 2005

(54) CERAMIC POWDER AND MULTILAYER CERAMIC DEVICE

(75) Inventors: Takashi Kamiya, Tokyo (JP); Osamu Otani, Tokyo (JP); Kaname Ueda, Tokyo (JP); Syunichi Yuri, Tokyo (JP); Hitoshi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 73 days.

(21) Appl. No.: 10/390,717

(22) Filed: Mar. 19, 2003

(65) Prior Publication Data

US 2003/0199385 A1 Oct. 23, 2003

(30) Foreign Application Priority Data

Mar. 19, 2002 (JP) .................................... 2002-076512

(51) Int. Cl.$^7$ ........................ C04B 35/465; B32B 18/00
(52) U.S. Cl. ...................... 501/137; 501/138; 501/501; 501/139; 428/403; 428/404; 264/615
(58) Field of Search ................. 501/137, 138, 501/139; 428/403, 404; 264/615; 361/321.4, 321.5

(56) References Cited

U.S. PATENT DOCUMENTS 6,254,991 B1 * 7/2001 Kono et al. ................. 428/403
6,268,054 B1 * 7/2001 Costantino et al. .......... 428/403
6,485,672 B1 * 11/2002 Nomura et al. .............. 264/615
6,628,502 B2 * 9/2003 Masumiya et al. ........ 361/321.2
6,656,590 B2 * 12/2003 Venigalla et al. ........... 428/403

FOREIGN PATENT DOCUMENTS

| JP | A 11-335176 | 12/1999 |
| JP | A 2001-351826 | 12/2001 |
| WO | WO00/51147 | * 8/2000 |

* cited by examiner

*Primary Examiner*—Karl Group
(74) *Attorney, Agent, or Firm*—Oliff & Berridge, PLC

(57) ABSTRACT

A ceramic powder including ceramic main component particles and additive component particles deposited on the surfaces of the main component particles. The mean particle size of the main component particles is made not more than 1.5 $\mu$m, and the mean particle size of the additive component particles is made not more than 0.31 $\mu$m. The content of the additive composition particles is made 0.1 to 5 wt % with respect to 100 parts by weight of the ceramic powder. The dispersibility of the additive component particles with respect to the main component particles is improved and the uniformity of the structure is promoted to suppress the occurrence of hetero phases. A multilayer ceramic electronic device having a high insulation breakdown voltage and long life even with a thickness of the dielectric layers of not more than 3 $\mu$m are provided.

19 Claims, 4 Drawing Sheets

CERAMIC POWDER AND MULTILAYER CERAMIC DEVICE

BACKGROUND OF THE INVENTION

1. Field of the Invention

The present invention relates to a ceramic powder suited to a thin multilayer ceramic device and a multilayer ceramic device using such a powder.

2. Description of the Related Art

A multilayer ceramic capacitor is broadly used as a compact, large capacity, high reliability electronic device. A large number are used in electrical equipment and electronic equipment. In recent years, along with the reduction in size and improvement in performance of such equipment, increasingly tough demands are being made for further reduction of size, increase of capacity, lowering of price, and improvement of reliability of such multilayer ceramic capacitors.

In recent years, demand has been rising for thin layer devices with thicknesses of dielectric layers of not more than 3 $\mu$m and further of not more than 2 $\mu$m. Along with such demands for thinner layers, it has become important to uniformly disperse the additive component in the dielectric layers into the main component. The reason is that if the additive component in the dielectric layers is not uniformly dispersed, the electrical properties, temperature properties, etc. will become nonuniform and the quality and reliability will drop. In particular, a thin layer dielectric is susceptible to the effects of nonuniform dispersion of the additive component, so uniform dispersion of the additive component is an important issue.

In the past, to cause uniform dispersion of the additive component, the technique of blending the barium titanate or other main component and additives using a ball mill etc., roasting the blend, and treating it by plasma has been usually used. With this past technique, however, it has not been possible to prevent the additive component particles in the dielectric layers from partially segregating. This segregation becomes a reason for occurrence of hetero phases between the dielectric layers. Further, these hetero phases become causes lowering the breakdown voltage of electronic devices and reducing the load life.

The size of the hetero phases caused in the dielectric layers is, in the large cases, about 1 to 2 $\mu$m. In a multilayer electronic device of a thickness of the dielectric layers greater than 5 $\mu$m, this does not become a major problem, but in the thin layer devices recently demanded, in particular, multilayer electronic devices having a thickness of the dielectric layers of not more than 3 $\mu$m or further of not more than 2 $\mu$m, the hetero phases generated have a large effect and it is not possible to secure the desired quality and reliability.

Further, as a method of suppressing occurrence of hetero phases, the method of reducing the fineness of the additives, for example, the method of forming a plurality of additives into a compound in advance by heating and then finely pulverizing the compound has been proposed. Additive component particles however tend to agglutinate more easily the smaller the particle size. Therefore, with the technique of reducing the particle sizes of the additives, it was not possible to sufficiently achieve the object of improving the dispersibility in the main components and preventing the occurrence of segregation and hetero phases.

Further, Japanese Unexamined Patent Publication (Koukai) No. 11-335176 studied the distribution of the particle sizes of the ceramic main component particles and disclosed a ceramic powder using ceramic main component particles having a predetermined distribution of particle size. That is, this publication discloses a ceramic powder having a median value of ceramic main component particles of not more than 5 $\mu$m and having a number of main component particles having a median value of not more than 1/5 of that of 10% to 30% of the overall number of main component particles.

With this conventional art, however, it was not possible to provide a multilayer ceramic electronic device having the recently demanded thickness of the dielectric layers (thickness between internal electrodes) of not more than 3 $\mu$m and further of not more than 2 $\mu$m, provided with a high breakdown voltage, long life, and high reliability.

SUMMARY OF THE INVENTION

An object of the present invention, in consideration of the above prior art, is to provide a ceramic powder for a multilayer ceramic electronic device improving the dispersibility of the additives and achieving a uniform composition so as to suppress the occurrence of hetero phases and achieve a high breakdown voltage and long life even with a thickness of dielectric layers of not more than 3 $\mu$m and further of not more than 2 $\mu$m.

To achieve the above object, according to a first aspect of the present invention, there is provided a ceramic powder including ceramic main component particles and additive component particles, wherein a content of the additive component particles with respect to 100 parts by weight of the ceramic powder is 0.1 to 5 wt %, a mean particle size of the main component particles is 0.1 to 1.5 $\mu$m, a mean particle size of the additive component particles is 0.01 to 0.31 $\mu$m, and the additive component particles are deposited on the surface of the ceramic main component particles.

The content of the additive component particles is preferably 0.1 to 5 wt % with respect to 100 parts by weight of the ceramic powder, more preferably 1.95 to 3.48 wt %, still more preferably 2.2 to 3.31 wt %, most preferably 2.2 to 2.8 wt %.

From the viewpoint of forming a dielectric provided with the dielectric temperature characteristic BJ (or X7R) of Type 2 of the JIS standard, the content of the additives is preferably 0.1 to 5 wt % with respect to 100 parts by weight of the ceramic powder. Note that the dielectric temperature characteristic BJ is the characteristic with a rate of change of the electrostatic capacity to a temperature change in a predetermined temperature range suppressed to a predetermined range.

From the viewpoint of suppressing short-circuit defects and extending the high temperature load life while securing the dielectric temperature characteristic, the content of the additive component particles is preferably 1.95 to 3.48 wt %, more preferably 2.2 to 3.31 wt %. When 2.2 to 2.8 wt %, it is possible to suppress short-circuit defects and extend the high temperature load life with a good balance.

The mean particle size of the main component particles is preferably 0.1 to 0.8 $\mu$m, more preferably 0.1 to 0.63 $\mu$m, particularly preferably 0.1 to 0.22 $\mu$m.

From the viewpoint of suppressing short-circuit defects in a multilayer ceramic capacitor, it is necessary that there be a plurality of main component particles in the dielectric layers (between the internal electrodes). When fabricating a multilayer ceramic electronic device having a thickness of dielectric layers (interval between internal electrodes) of not more than 3 $\mu$m, the mean particle size of the main component particles is preferably made 0.1 to 1.5 $\mu$m.

The reason is that if the mean particle size of the main component particles is less than 0.1 μm, when fabricating a multilayer ceramic capacitor, the drop in the permittivity becomes remarkable, while if larger than 1.5 μm, it becomes difficult to form dielectric layers having a thickness of not more than 3 μm and further of not more than 2 μm.

It is more preferable to make the mean particle size of the main component particles 0.1 to 0.8 μm. By making the mean particle size of the main component particles not more than 0.8 μm, the breakdown voltage (VB) becomes higher.

It is further preferable to make the mean particle size of the main component particles 0.1 to 0.63 μm. By this, it is possible to further lower the VB defect rate and further extend the high temperature load life.

It is particularly preferable to make the mean particle size of the main component particles 0.1 to 0.22 μm. In this range, it is possible to further lower the VB defect rate and in addition possible to further extend the life.

By making the mean particle size of the main component particles the above ranges, it is possible to provide a plurality of main component particles in a dielectric layer having a thickness of not more than 3 μm and further of not more than 2 μm.

Due to this, it is possible to prevent short-circuit defects and extend the high temperature load life of a multilayer ceramic electronic device. As a result, it is possible to achieve a reduction in the VB defect rate and an extension of the relative life.

As the main component particles, it is preferable to use one type or two or more types of particles selected from $BaTiO_3$, $CaTiO_3$, $SrTiO_3$, and $BaZrO_3$.

When the mean particle size of the main component particles is in the above ranges, the mean particle size of the additive component particles is preferably 0.01 to 0.31 μm.

If the mean particle size of the additive component particles is too small, the effect of the present invention is not obtained. If the particle size of the additive component particles is too large, there is a tendency for the number of additive component particles included per predetermined content of the additive components to end up being reduced. If this occurs, it tends not to be possible to cause additive component particles to deposit on all of the main component particles or for the surfaces of the main component particles to be uniformly covered by the additive component particles.

That is, since the additive component particles do not uniformly deposit on the surfaces of the main component particles and there are main component particles on which additive component particles are not deposited, the dispersibility of the additive component particles in the main component particles tends to end up declining. Further, when there are a plurality of additive component particles having particle sizes of 0.31 μm or more deposited on a single main component particle, the amount of the additives per single main component particle becomes excessive and the additive components end up segregating on the surfaces of the main component particles at the time of fire. This segregation becomes a cause of hetero phases.

For the above reasons, in the present invention, the mean particle size of the additive component particles is made 0.01 to 0.31 μm. By causing additive component particles having a particle size of 0.01 to 0.31 μm to deposit on the surfaces of the main component particles, it is possible to make the additive component uniformly disperse in the main component.

Due to this, it is possible to suppress the occurrence of hetero phases and make the structure uniform. As a result, it is possible to keep high the breakdown voltage (VB) of a multilayer electronic device having a thickness of the dielectric layers between internal electrodes of not more than 3 μm and further of not more than 2 μm and possible to obtain a multilayer ceramic capacitor with a long high temperature load life.

Similarly, from the viewpoint of improving the dispersibility and preventing segregation, the mean particle size of the additive component particles is more preferably 0.01 to 0.17 μm, still more preferably 0.01 to 0.12 μm, and particularly preferably 0.01 to 0.04 μm.

By making the particle size of the additive component particles the above range, it is possible to prevent the occurrence of hetero phases and realize a long life and high breakdown voltage.

The additive component particles preferably include at least a compound imparting resistance to reduction. The additive components preferably include at least one compound selected from the group of compounds including a Ca compound, Sr compound, Ba compound, Mg compound, V compound, Cr compound, Mn compound, Li compound, B compound, Si compound, Ti compound, Zr compound, Y compound, Nb compound, Hf compound, Eu compound, Gd compound, Tb compound, Dy compound, Ho compound, Er compound, Tm compound, Yb compound, and Lu compound.

The additive component particles preferable are two or more different types of compound particles selected from the above group of compounds. By the plurality of types of compound particles depositing on the main component particles, it is possible to impart a plurality of characteristics given by the compounds to the product (ceramic powder and electronic device using ceramic powder). In particular, it is preferable that the additive component particles be compounds imparting resistance to reduction. Due to these characteristics, it is possible to maintain the breakdown voltage of the electronic device.

The additive component particles are more preferably at least four types of compound particles selected from the above group of compounds.

These four or more types of additive component particles are preferably selected from the groups of a first group of elements (Ca, Sr, Ba, and Mg), a second group of elements (V, Cr, and Mn), a third group of elements (Li, B, and Si), and a fourth group of elements (Ti, Zr, Y, Nb, Hf, Eu, Gd, Tb, Dy, Ho, Er, Tm, Yb, and Lu).

The additive component particles preferably include at least a first compound including at least one element selected from a first group of elements (Ca, Sr, Ba, and Mg), a second compound including at least one element selected from a second group of elements (V, Cr, and Mn), a third compound including at least one element selected from a third group of elements (Li, B, and Si), and a fourth compound including at least one element selected from a fourth group of elements (Ti, Zr, Y, Nb, Hf, Eu, Gd, Tb, Dy, Ho, Er, Tm, Yb, and Lu).

The characteristics of the compounds belonging to the groups will be explained next.

The Ba in the first group of elements (Ca, Sr, Ba, and Mg) makes the Ba/Ti ratio of the barium titanate ($BaTiO_3$) of the main component at least 1.0, and have the effect of imparting resistance to reduction becomes greater. Ca functions as an acceptor at the Ti side over a wide range and contributes to an increase in the insulation resistance even in firing in a reducing atmosphere. Mg suppresses grain growth, suppresses the peak permittivity near 125° C., and flattens the temperature characteristic over a wide temperature range.

The elements of the second group of elements (V, Cr, and Mn) function as both acceptors and donors and contribute to the resistance to reduction. Further, the reoxidation and other annealing effects are also large. Further, the temperature characteristic is controlled.

The elements of the third group of elements (Li, B, and Si) reduce the sintering temperature of the dielectric materials. Further, there is the effect of becoming a liquid phase and smoothly promoting the transfer of oxygen. In particular, Li functions as an acceptor in solid dissolution to the Ba side and contributes to the resistance to reduction.

The elements of the fourth group of elements (Ti, Zr, Y, Nb, Hf, Eu, Gd, Tb, Dy, Ho, Er, Tm, Yb, and Lu) function as both donors and acceptors, contribute to the resistance to reduction, and increase the insulation resistance even with firing in a reducing atmosphere.

By adding at least one type of compound from each of the first group of elements to fourth group of elements, it is possible to impart the characteristics of each group and possible to obtain a ceramic powder or electronic device having the desired characteristics.

Further, the fourth group of elements is preferably divided into the two groups of a 4-1st group of elements and 4-2nd group of elements. The additive component particles preferably further include a 4-1st compound including at least one type of element selected from the 4-1st group of elements (Ti and Zr) and a 4-2nd compound including at least one type of element selected from the 4-2nd group of elements (Y, Nb, Hf, Eu, Gd, Tb, Dy, Ho, Er, Tm, Yb, and Lu).

In particular, it is preferable to select two or more types of elements from the 4-2nd group of elements and include a 4-2nd compound including the selected elements in the additive component particles.

The additive component particles preferably include at least a first compound including at least one element selected from a first group of elements (Ca, Sr, Ba, and Mg), a second compound including at least one element selected from a second group of elements (V, Cr, and Mn), a third compound including at least one element selected from a third group of elements (Li, B, and Si), a 4-1st compound including at least one element selected from a 4-1st group of elements (Ti and Zr), and a 4-2nd compound including at least one element selected from a 4-2nd group of elements (Y, Nb, Hf, Eu, Gd, Tb, Dy, Ho, Er, Tm, Yb, and Lu).

The 4-1st compound controls the temperature characteristic and permittivity to improve the flatness of the temperature-electrostatic capacity characteristic. The 4-2nd compound raises the breakdown voltage and extends the high temperature load life. If combining two or more types of 4-2nd compounds, the effect is obtained of extending the high temperature load life.

When fabricating a multilayer capacitor or other multilayer electronic device according to the present invention having dielectric layers formed by the ceramic powder, it is possible to reduce the thickness of the dielectric layers between internal electrodes of the electronic device to not more than 3 µm and further to not more than 2 µm and contribute to thinner, greater layer, and smaller multilayer ceramic electronic devices.

BRIEF DESCRIPTION OF THE DRAWINGS

These and other objects and features of the present invention will be explained in further detail with reference to the attached drawings, wherein.

DESCRIPTION OF THE PREFERRED EMBODIMENTS

Multilayer Ceramic Capacitor

Figure 1:
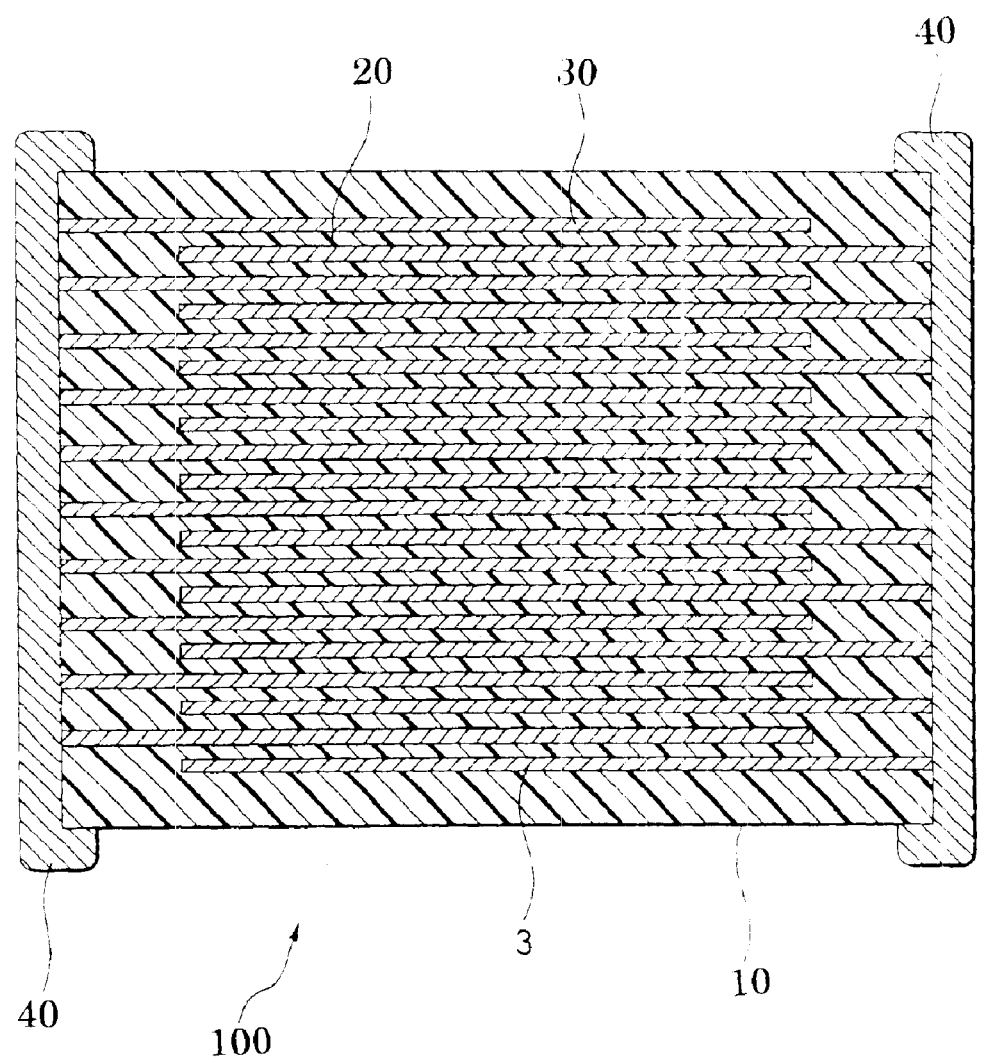
FIG. 1 is a sectional view of a multilayer ceramic capacitor according to an embodiment of the present invention.

As shown in FIG. 1, a multilayer ceramic capacitor (100) according to an embodiment of the present invention has a capacitor device body (10) of a configuration of dielectric layers (20) and internal electrode layers (30) stacked alternately. At the two ends of the capacitor device body (10) are formed a pair of external electrodes (40) conductive with the internal electrode layers (30) alternately arranged inside the device body (10). The shape of the capacitor device body (10) is not particularly limited, but normally is made a rectangular parallelopiped. Further, the dimensions are not particularly limited and may be made suitable dimensions in accordance with the application. Usually, however, they are (0.6 to 5.6 mm)×(0.3 to 5.0 mm)×(0.3 to 1.9 mm).

The internal electrode layers (30) are stacked so that end faces thereof alternately protrude out to the surfaces of the two opposing ends of the capacitor device body (10). The pair of external electrodes (40) are formed at the two ends of the capacitor device body (10) and are connected to the exposed end faces of the alternately arranged internal electrode layers (30) to form a capacitor circuit.

Dielectric Layers 20

The dielectric layers (20) are produced using the ceramic powder of the present invention. The method of production will be explained later.

Figure 2:
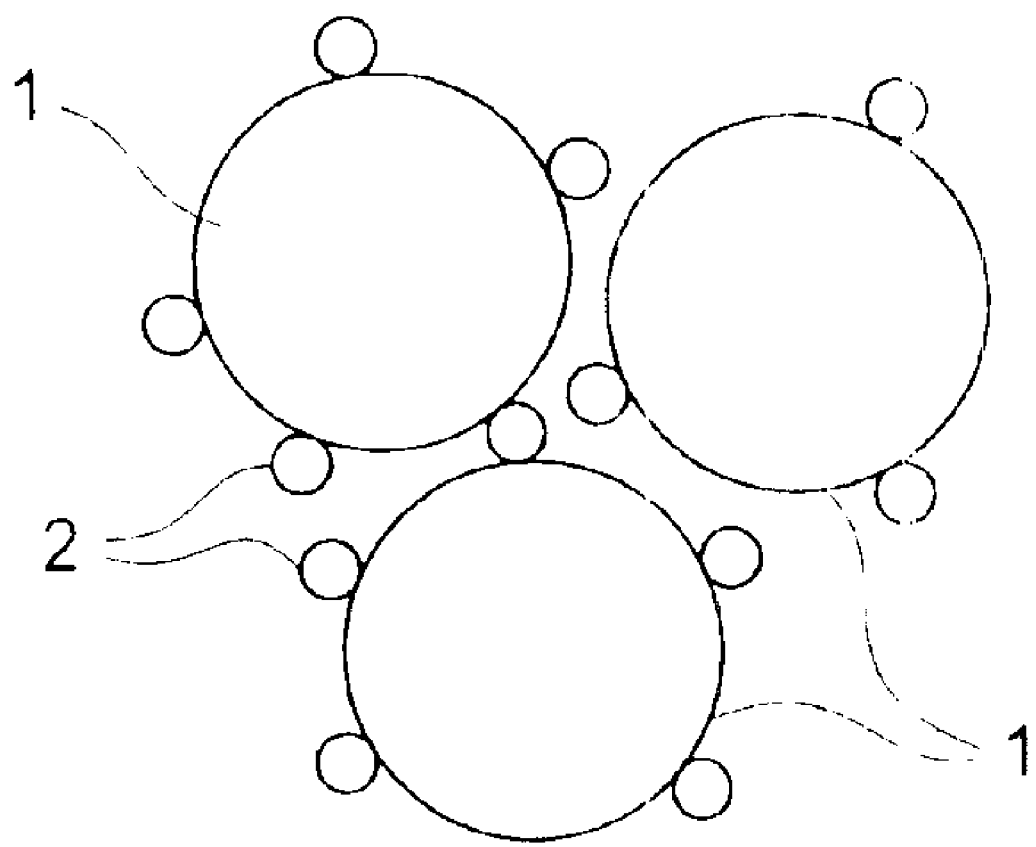
FIG. 2 is a conceptual view of the configuration of the ceramic powder of the present invention.

The ceramic powder of the present invention, as shown in FIG. 2, is comprised of the main component particles (1) on the surface of which additive component particles (2) are deposited. The additive component particles (2) are deposited on the main component particles (1) in a state with the additive component particles not agglomerated. Further, the additive component particles (2) are uniformly dispersed and deposited on the surfaces of the main component particles (1).

The thickness of the dielectric layer (20) of the present embodiment is not particularly limited, but may be made not more than 3 µm and further not more than 2 µm. Further, even if made not more than 3 µm and further not more than 2 µm, superior characteristics of a high breakdown voltage and long life are exhibited.

Internal Electrode Layers 30

The electroconductive material contained in the internal electrode layers (30) is not particularly limited, but a base metal may be used since the material constituting the dielectric layers (20) has resistance to reduction. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %.

Note that the Ni or Ni alloy may contain P and other various types of trace components in amounts of not more than 0.1 wt % or so.

The thickness of the internal electrode layers(30) may be suitably determined in accordance with the application etc. The dielectric layers of the present embodiment are preferably formed to a thickness of 0.01 to 5 μm, more preferably formed to a thickness of 0.01 to 3 μm, particularly preferably 0.01 to 2.0 μm.

External Electrodes 40

The electroconductive material contained in the external electrodes (40) is not particularly limited, but in the present invention, an inexpensive Ni, Cu, or alloys of the same are used.

The thickness of the external electrodes may be suitably determined in accordance with the application etc., but is usually 10 to 100 μm or so.

Method of Manufacturing Multilayer Ceramic Capacitor

The method of manufacturing a multilayer ceramic capacitor according to the present invention will be explained using FIG. 3. The multilayer ceramic capacitor according to the present embodiment is produced using the ceramic powder according to the present invention.

In this embodiment, the ceramic powder is a ceramic powder including ceramic main component particles and additive component particles, where a content of the additive component particles with respect to 100 parts by weight of the ceramic powder is 0.1 to 5 wt %, a mean particle size of the main component particles is 0.1 to 1.5 μm, a mean particle size of the additive component particles of 0.01 to 0.31 μm, and the additive component particles deposits on the surfaces of the ceramic main component particles.

Figure 3:
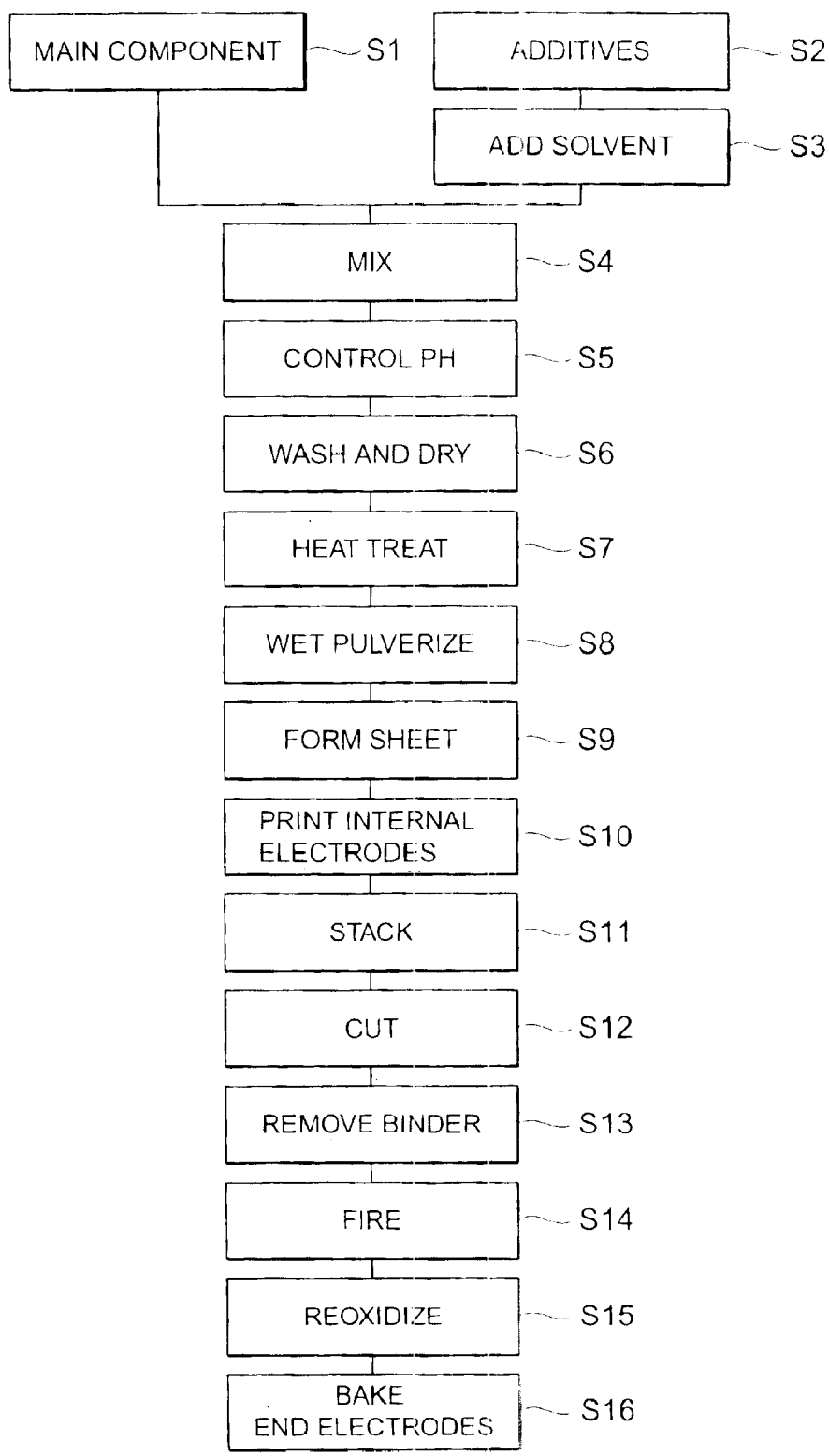
FIG. 3 is a process diagram of an example of a method of production of a ceramic powder of the present invention.

As shown in FIG. 3, first, the main component particles are prepared (S1). The main component particles in the present embodiment preferably include at least one type of oxide selected from $BaTiO_3$, $CaTiO_3$, $SrTiO_3$, and $BaZrO_3$.

The mean particle size of the main component particles is preferably 0.1 to 1.5 μm, more preferably 0.1 to 0.8 μm, still more preferably 0.1 to 0.63 μm, particularly preferably 0.1 to 0.22 μm. The main component particles may be used as they are or may be dissolved in alcohol or another solvent.

The additive component is prepared (S2). In the present embodiment, the additive component particles are dissolved in a solvent to prepare a solution.

In the ceramic powder of the present embodiment, the mean particle size of the additive component particles is preferably 0.01 to 0.31 μm, more preferably 0.01 to 0.17 μm, still more preferably 0.01 to 0.11 μm, and particularly preferably 0.01 to 0.04 μm.

The content of the additive component particles is 1.95 to 3.48 wt % with respect to 100 parts by weight of the ceramic powder, preferably 2.2 to 3.31 wt %, further preferably 2.8 to 3.31 wt %.

The additive component includes at least one compound selected from the group of compounds including a Ca compound, Sr compound, Ba compound, Mg compound, V compound, Cr compound, Mn compound, Li compound, B compound, Si compound, Ti compound, Zr compound, Y compound, Nb compound, Hf compound, Eu compound, Gd compound, Tb compound, Dy compound, Ho compound, Er compound, Tm compound, Yb compound, and Lu compound.

While not particularly limited, the additive component particles preferably include a first compound including at least one element selected from a first group of elements (Ca, Sr, Ba, and Mg), a second compound including at least one element selected from a second group of elements (V, Cr, and Mn), a third compound including at least one element selected from a third group of elements (Li, B, and Si), and a fourth compound including at least one element selected from a fourth group of elements (Ti, Zr, Y, Nb, Hf, Eu, Gd, Tb, Dy, Ho, Er, Tm, Yb, and Lu).

While not particularly limited, the additive component particles alternatively preferably include a first compound including at least one element selected from a first group of elements (Ca, Sr, Ba, and Mg), a second compound including at least one element selected from a second group of elements (V, Cr, and Mn), a third compound including at least one element selected from a third group of elements (Li, B, and Si), a 4-1st compound including at least one element selected from a 4-1st group of elements (Ti and Zr), and a 4-2nd compound including at least one element selected from a 4-2nd group of elements (Y, Nb, Hf, Eu, Gd, Tb, Dy, Ho, Er, Tm, Yb, and Lu).

As the solvent for dissolving the additive component particles, it is preferable to use alcohol, benzene or its derivative, chloroform, etc. It is also possible to use a mixed solvent of benzene or a benzene derivative and alcohol instead of alcohol or benzene alone.

The additive component in the solution is present as an alkoxide complex or other metal complex or metal salt. As specific examples of alkoxides, there are a methoxide, ethoxide, propoxide, butoxide, pentyloxide, ethoxyethoxide, methoxyethoxide, etc. The number of alcoholate ligands in the alkoxide complex is usually one to six. Further, in the same alkoxide complex, the alcoholate ligands in the metal may be the same or there may be different alcoholate ligands. The additive component particles in the solvent are for example $Ba(OC_2H_5)_2$, $Ca(OC_2H_5)_2$, $Sr(OC_2H_5)_2$, $Mg(OC_2H_5)_4$, $V(OC_2H_5)_5$, etc.

The Cr compound, Y compound, Mn compound, W compound, Zr compound, or other additive component can be prepared as a solution of an acetate, oxalate, or other complex. Further, the additive component can be prepared as a solution of a β-diketonite complex.

The prepared main component and additive component prepared as a solution are mixed (S4). Ammonia water, ammoniun carbonate, etc. are added to the slurry obtained by mixing to control the pH 8 to 12 (S5). At this stage, hydroxide particles and/or oxide particles of the additive component precipitate on the surface of the main component particles.

The slurry obtained at S5 is filtered and washed, then dried (S6).

This powder is heat treated at 700 to 1100° C. (S7). The heat treatment is performed to cause a heat decomposition reaction so that the additive component turns into oxides. This is because if under 700° C., the heat decomposition reaction is insufficient, while if over 1100° C., the pulverization at the next stage becomes difficult. The heat treatment time is preferably 1 to 12 hours.

In this way, the method of production of a ceramic powder of the present embodiment has at least a step of making an additive component to be added to a main component a solution, a step of mixing the solution including the additive component and the main component, a step of controlling the liquidity (pH) of the main component and additive component mixed, and a step of heat treating the main component and additive component controlled in liquidity.

After steps S1 to S7, the additive component particles are deposited on the surface of the main component particles. The additive component particles are uniformly deposited on the surfaces of the main component particles in the state with the plurality of particles not agglomerated.

The multilayer ceramic capacitor using the ceramic powder obtained, in the same way as a conventional multilayer ceramic capacitor, is produced by preparing a green chip using the usual printing method or sheet method which uses pastes, firing the green chip, then printing or transferring the external electrodes and firing.

That is, using a ball mill and an organic solvent as a dispersant, the organic binder and plasticizer are added and sufficiently wet mixed to prepare a slurry of a ceramic material (S8). Using this slurry, a sheet is formed by the doctor blade method (S9). The green sheet of the obtained dielectric ceramic is then dried.

Using a conductive paste, a plurality of internal electrode patterns are printed on one surface of the green sheet (S10). After drying, a plurality of green sheets are stacked and press bonded (S11). The stacked green sheets are then cut (S12).

The stack is heated at 280° C. in an air atmosphere for 5 hours to remove the binder (S13). The stack is then fired in a flow of reducing gas having a volume ratio of $H_2/N_2$ of 3/100 at about 1250° C. for 2 hours (S14).

Next, to compensate for the oxygen lost due to the sintering, the chip is fired in an air atmosphere at 800° C. for 4 hours (S15). The two ends of the sintered body are baked on with Cu paste to form end electrodes (S16). The thus produced multilayer ceramic capacitor of the present invention is mounted by soldering it onto a printed circuit board for use in various types of electronic equipment.

Note that the present invention is not limited to the above embodiment and may be modified in various ways within the scope of the invention.

For example, in the above embodiment, a multilayer ceramic capacitor was illustrated as an electronic device according to the present invention, but the electronic device according to the present invention is not limited to a multilayer ceramic capacitor and may be any device having dielectric layers comprised of dielectric ceramic compositions of the above configuration.

Below, the present invention will be explained in further detail with reference to more detailed examples, but the present invention is not limited to these examples.

EXAMPLE 1

In Example 1, a multilayer ceramic capacitor was prepared using the method of production explained in FIG. 3.

First, main component particles of a mean particle size of 0.63 $\mu$m were prepared (S1). $BaTiO_3$ was used for the main component. 3 wt % of the activant and 100 cc of ethanol were placed in a pot made of polyethylene together with respect to 100 g of $BaTiO_3$ together with 300 g of zirconia beads of diameters of 2 mm as a mixing medium and mixed and dispersed for 16 hours. An alcohol solution of the main component was therefore obtained.

Next, a solution of the additive component particles was prepared (S2). That is, alcohol was added to the additive component to prepare a metal alkoxide solution (S3).

As the additive component, an Mg compound, Ca compound, Ba compound, Cr compound, Y compound, and Si compound were used.

The additive component was added to give the contents shown in Example 1 of Table 1 converted to oxides. That is, metal alkoxide solutions were measured to give 0.3 part by weight of MgO, 0.2 part by weight of CaO, 0.5 part by weight of BaO, 0.1 part by weight of $Cr_2O_3$, 0.8 part by weight of $Y_2O_3$, and 0.3 part by weight of $SiO_2$ with respect to 100 parts by weight of ceramic powder.

The alcohol solution of the main component and the metal alkoxide solutions of the additive component were combined and mixed for 5 hours (S4).

Next, ammonia water was added to this slurry to control the pH (pH=10). Hydroxide and oxide powders of the metals deposited on the surface of the $BaTiO_3$.

The slurry was filtered and washed, then the solid content was dried to obtain a powder (S6).

The obtained powder was heat treated at a temperature of 800° C. for 5 hours to obtain a ceramic powder (S7).

Figure 4:
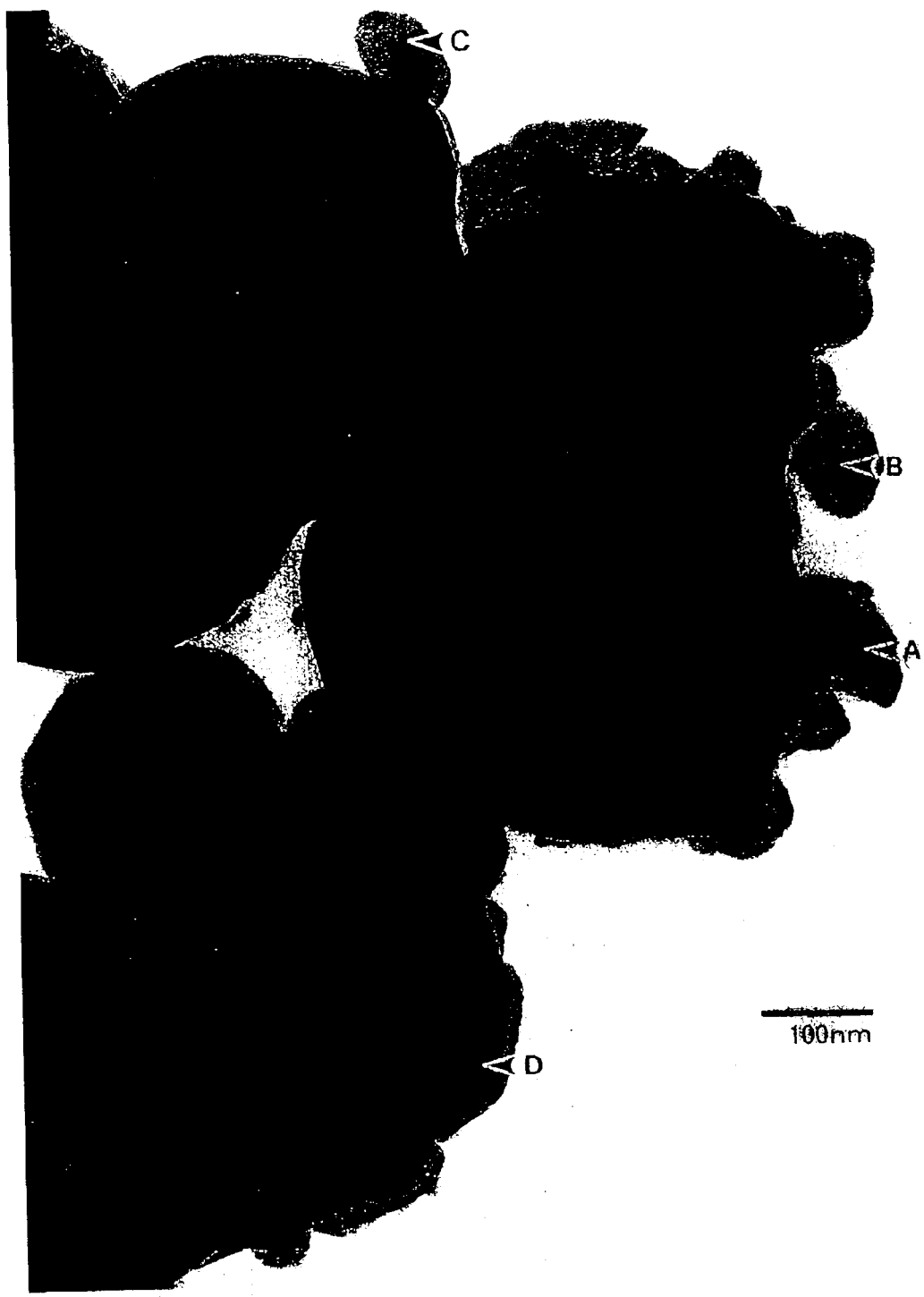
FIG. 4 is a photograph of the ceramic powder of the present invention.

The mean particle size of the ceramic powder was 0.63 $\mu$m. The surfaces of the main component particles of the ceramic powder had additive component particles deposited on them. A micrograph of the ceramic powder is shown in FIG. 4. As shown in the photograph of FIG. 4, the additive component particles A to D deposited on the main component particles without agglomeration. The additive component particles uniformly deposited on the outer surfaces of the main component particles.

When measured from the photograph of FIG. 4, the main particle size of the main component particles was in the ranges of 0.1 to 1.5 $\mu$m, 0.1 to 0.8 $\mu$m, 0.1 to 0.63 $\mu$m, or 0.1 to 0.22 $\mu$m, while the mean particle size of the additive component particles was in the ranges of 0.01 to 0.31 $\mu$m, 0.01 to 0.17 $\mu$m, 0.01 to 0.11 $\mu$m, or 0.01 to 0.04 $\mu$m.

The thus prepared ceramic powder was used to fabricate multilayer ceramic capacitors using the same steps as the steps S8 to S16 shown in FIG. 3. The obtained multilayer ceramic capacitors had thicknesses of dielectric layers of 2 $\mu$m and a number of stacked dielectric layers of 350 layers. The outside dimensions of the product were those of a 2012 Type (2.0 mm×12 mm).

EXAMPLES 2 to 4

As shown in Table 1, the same procedure was followed as with Example 1 so as to fabricate the multilayer ceramic capacitors of Examples 2 to 4 except for making the mean particle sizes of the main component particles different. The mean particle size of the main component particles of Example 2 was 0.22 $\mu$m, the mean particle size of the main component particles of Example 3 was 0.78 $\mu$m, and the mean particle size of the main component particles of Example 4 was 1.5 $\mu$m.

In Example 5, the same procedure was followed as with Example 1 to fabricate a multilayer ceramic capacitor except for making the mean particle size of the additive component particles different.

Table 1 shows the VB defect rates of Examples 1 to 5 and the later mentioned Comparative Examples 1 and 2 and the relative lives of Examples 1 to 5 (life ratio in case of making life of Comparative Example 2 the value "1").

TABLE 1

| Ex. no. | Particle size and % comp. | Main component Element group no. BT1 | Additives 1 MgO | Additives 1 CaO | Additives 1 BaO | Additives 2 $Cr_2O_3$ | Additives 4 $Y_2O_3$ | Additives 3 $SiO_2$ | Total additives (wt %) | Characteristics VB defect rate (%) | Characteristics Relative life |
|---|---|---|---|---|---|---|---|---|---|---|---|
| Ex. 1 | P. size (μm) | 0.63 | 0.03 | 0.02 | 0.08 | 0.01 | 0.11 | 0.07 | 2.2 | 9 | 8 |
|  | % comp. (wt %) | 97.8 | 0.3 | 0.2 | 0.5 | 0.1 | 0.8 | 0.3 |  |  |  |
| Ex. 2 | P. size (μm) | 0.22 | 0.03 | 0.02 | 0.02 | 0.01 | 0.04 | 0.01 | 2.2 | 4 | 10 |
|  | % comp. (wt %) | 97.8 | 0.3 | 0.2 | 0.5 | 0.1 | 0.8 | 0.3 |  |  |  |
| Ex. 3 | P. size (μm) | 0.78 | 0.03 | 0.02 | 0.06 | 0.01 | 0.11 | 0.04 | 2.2 | 15 | 6 |
|  | % comp. (wt %) | 97.8 | 0.3 | 0.2 | 0.5 | 0.1 | 0.8 | 0.3 |  |  |  |
| Ex. 4 | P. size (μm) | 1.5 | 0.03 | 0.02 | 0.08 | 0.01 | 0.11 | 0.07 | 2.2 | 29 | 3 |
|  | % comp. (wt %) | 97.8 | 0.3 | 0.2 | 0.5 | 0.1 | 0.8 | 0.3 |  |  |  |
| Ex. 5 | P. size (μm) | 0.63 | 0.15 | 0.11 | 0.17 | 0.03 | 0.31 | 0.09 | 2.2 | 28 | 1.4 |
|  | % comp. (wt %) | 97.8 | 0.3 | 0.2 | 0.5 | 0.1 | 0.8 | 0.3 |  |  |  |
| Comp. Ex. 1 | P. size (μm) | 1.9 | 0.03 | 0.02 | 0.08 | 0.01 | 0.11 | 0.07 | 2.2 | 100 | — |
|  | % comp. (wt %) | 97.8 | 0.3 | 0.2 | 0.5 | 0.1 | 0.8 | 0.3 |  |  |  |
| Comp. Ex. 2 | P. size (μm) | 0.63 | 0.01 | 0.01 | 0.01 | 0.01 | 0.01 | 0.01 | 2.2 | 40 | 1 |
|  | % comp. (wt %) | 97.8 | 0.3 | 0.2 | 0.5 | 0.1 | 0.8 | 0.3 |  |  |  |

In Comparative Example 1, the same procedure was followed as in Example 1 to fabricate a multilayer ceramic capacitor other than making the mean particle size of the main component particles 1.9 μm.

In Comparative Example 2, ceramic powder fabricated using the conventional roasting method was used to fabricate a multilayer ceramic capacitor. That is, the additive components shown in Table 1 were weighed and combined, then water added and the result mixed and pulverized. The pulverized slurry was dried by hot air in a batch furnace, then roasted. Next, this was wet pulverized, dehydrated, and dried. The obtained additive component particles were mixed with the main component particles. The rest of the steps are similar to S9 to S16 shown in FIG. 3.

The "particle size of the additives" shown in Table 1 shows the particle size of the largest particles among the five additive component particles when observing additive component particles of the examples and comparative examples by an electron microscope.

The VB defect rate shows the ratio of the VB defect samples in 100 samples. A "VB defect sample" is a sample experiencing insulation breakdown when continuously applying 40V per 1 μm between dielectric layers or less by a VB measurement device.

Further, the "relative life" is the relative life indexed to the high temperature accelerated life of Comparative Example 2 as "1". The "high temperature accelerated life"0 is the life when continuously applying 20V DC at an ambient temperature of 200° C.

EXAMPLES 6 to 13

In Examples 6 to 12 shown in Table 2, the same procedure was followed as in Example 1 to fabricate multilayer ceramic capacitors except for using, in addition to the additives of Examples 1 to 5, compounds selected from Li compounds, B compounds, Mn compounds, Dy compounds, Ho compounds, Zr compounds, Ti compounds, Yb compounds, and Sr compounds as additives.

In Example 13, the mean particle size of the main component particles was made a smaller 0.15μ and the mean particle size of the additive component particles was made 0.01 to 0.03 μm.

The "particle size" of the additive, "VB defect rate", and "relative life" shown in Table 2 were as explained in Table 1.

TABLE 2

| Ex. no. | Particle size (μm) and composition (wt %) | Main component Element group no. BT1 | Additives | | | | | | | | | | | | | | | Total additives (wt %) | Characteristics | |
|---|---|---|---|---|---|---|---|---|---|---|---|---|---|---|---|---|---|---|---|---|
| | | | 1 MgO | 1 CaO | 1 BaO | 2 V$_2$O$_5$ | 4 (4-2) Y$_2$O$_3$ | 3 SiO$_2$ | 3 Li$_2$O | 3 B$_2$O$_3$ | 2 MnO | 4 (4-2) Dy$_2$O$_3$ | 4 (4-2) Ho$_2$O$_3$ | 4 (4-1) ZrO$_2$ | 4 (4-1) TiO$_2$ | 4 (4-2) Yb$_2$O$_3$ | 1 SrO | | VB defect rate (%) | Relative service life |
| Ex. 6 | P. size | 0.63 | 0.03 | 0.02 | 0.08 | | | 0.07 | 0.08 | 0.05 | 0.06 | 0.07 | | 0.12 | | | 0.06 | 2.8 | 5 | 12 |
| | % comp. | 97.2 | 0.2 | 0.05 | 0.1 | | | 0.2 | 0.03 | 0.02 | 0.1 | 0.7 | | 1.2 | | | 0.2 | | | |
| Ex. 7 | P. size | 0.63 | 0.03 | 0.02 | 0.02 | | | 0.01 | 0.08 | 0.05 | 0.06 | | 0.09 | 0.12 | | | 0.06 | 3.3 | 11 | 6 |
| | % comp. | 96.7 | 0.2 | 0.05 | 0.2 | | | 0.2 | 0.03 | 0.05 | 0.1 | | 0.9 | 1.5 | | | | | | |
| Ex. 8 | P. size | 0.63 | 0.03 | 0.02 | 0.06 | 0.01 | 0.11 | 0.04 | 0.03 | 0.02 | 0.06 | | | | | | 0.1 | 3.48 | 8 | 4 |
| | % comp. | 96.52 | 0.03 | 0.03 | 0.02 | 0.62 | 2.1 | 0.61 | | | 0.07 | | | | | | | | | |
| Ex. 9 | P. size | 0.63 | 0.03 | 0.02 | 0.08 | | | 0.07 | | | 0.06 | 0.07 | | | | | 0.06 | 1.95 | 18 | 3 |
| | % comp. | 98.05 | 0.2 | 0.05 | 0.1 | | | 0.6 | | | 0.1 | 0.7 | | | | | 0.2 | | | |
| Ex. 10 | P. size | 0.63 | 0.03 | 0.11 | 0.17 | | | 0.09 | 0.08 | | 0.06 | | 0.09 | 0.12 | | | 0.06 | 3.31 | 7 | 5 |
| | % comp. | 96.69 | 0.2 | 0.03 | 0.2 | | | 0.2 | 0.03 | | 0.15 | | 0.9 | 1.5 | | | 0.2 | | | |
| Ex. 11 | P. size | 0.63 | 0.03 | 0.02 | 0.08 | | 0.11 | 0.07 | | | 0.06 | 0.07 | | | | | 0.1 | 1.95 | 16 | 4 |
| | % comp. | 98.05 | 0.2 | 0.05 | 0.1 | | 0.2 | 0.6 | | | 0.1 | 0.7 | | | | | | | | |
| Ex. 12 | P. size | 0.63 | 0.03 | 0.11 | 0.17 | 0.03 | | 0.09 | 0.08 | | 0.06 | | 0.09 | 0.12 | 0.02 | | | 3.31 | 6 | 6 |
| | % comp. | 96.69 | 0.2 | 0.03 | 0.2 | 0.2 | | 0.2 | 0.03 | | 0.15 | | 0.8 | 1.5 | 0.02 | | | | | |
| Ex. 13 | P. size | 0.15 | 0.03 | 0.02 | 0.2 | 0.03 | 0.03 | 0.01 | | | 0.03 | | | | | 0.01 | | 3.31 | 3 | 9 |
| | % comp. | 96.69 | 0.2 | 0.03 | | 0.3 | 1.5 | 0.02 | | | 0.04 | | | | | 1.20 | | | | |

Evaluation of Examples 1 to 13
(Evaluation Relating to Method of Production)

As will be understood from Table 1, when designating the high temperature load life of Comparative Example 2 produced by the conventional roasting method, the high temperature load lives of Examples 1 to 5 produced by the method of production of the present embodiment were 1.4 to 10. That is, the high temperature load lives of Examples 1 to 5 were 1.4 to 10 times that of Comparative Example 2.

Further, while the VB defect rate of Comparative Example 2 was 40%, the VB defect rates of Examples 1 to 5 was 4 to 28%. That is, the VB defect rates of Examples 1 to 5 were 10 to 70% of Comparative Example 2.

(Evaluation Relating to Mean Particle Size of Main Component Particles)

As will be understood from Table 1, while the VB defect rate of Comparative Example 1 having a mean particle size of the main component particles of 1.9 μm was 100%, the VB defect rates of Examples 1 to 5 having mean particle sizes of the main component particles of 0.1 to 1.5 μm were 3% to 29%.

Specifically, while the VB defect rate was 100% in Comparative Example 1, the VB defect rate of Example 4 having a mean particle size of the main component particle of 1.5 μm was 29%, the VB defect rate of Example 3 having a mean particle size of the main component particle of 0.78 μm was 15%, the VB defect rate of Example 1 having a mean particle size of the main component particle of 0.63 μm was 9%, the VB defect rate of Example 2 having a mean particle size of the main component particle of 0.22 μm was 4%, and the VB defect rate of Example 13 having a mean particle size of the main component particle of 0.15 μm was 3%. In this way, if the particle size of the main component particles becomes small, there is a tendency seen for the VB defect rate to drop.

Further, as will be understood from Table 1, the life of Example 4 having a mean particle size of the main component particles of 1.5 μm was 3, the relative life of Example 3 having a mean particle size of the main component particles of 0.78 μm was 6, the relative life of Example 1 having a mean particle size of the main component particles of 0.63 μm was 8, and the relative life of Example 2 having a mean particle size of the main component particles of 0.22 μm was 10. In this way, a tendency was seen for the relative life to become longer the smaller the particle size of the main component particles.

(Evaluation Relating to Content of Additive Component Particles)

As in Examples 1 to 5 shown in Table 1, when the mean particle size of the main component particles is 0.1 to 1.5 μm and the content of the additive component particles is 2.2 wt %, low VB defect rates and long relative lives are exhibited.

As will be understood from Table 2, Examples 6 to 13 where when the mean particle size of the main component particles is 0.63 μm, the content of the additive component particles is in the range of 1.95 to 3.48 wt % with respect to 100 parts by weight of the ceramic powder, exhibit low VB defect rates and long relative lives.

Examples 6, 7, 10, 12, and 13 having contents of the additive component particles of 2.2 to 3.31 wt % exhibited lower defect rates and longer relative lives.

Example 6 having a content of additive component particles in the range of 2.2 to 2.8 wt % exhibited particularly low VB defect rates and long relative lives.

(Effects of Particle Size of Additive Component Particles)

As will be understood from Table 1, Examples 1 to 5 having mean particle sizes of the additive component particles of 0.01 to 0.31 μm exhibited low VB defect rates and long relative lives.

Example 10 and Example 12 having mean particle sizes of the additive component particles in the range of 0.01 to 0.17 μm exhibited low VB defect rates and long relative lives.

Example 1, Example 3, Example 4, Example 6, Example 7, Example 8, and Example 11 having mean particle sizes of the additive component particles in the range of 0.01 to 0.12 μm exhibited low VB defect rates and long relative lives.

Example 2 where the mean particle size of the additive component particles was in the range of 0.01 to 0.04 μm exhibited a low VB defect rate and a long relative life.

In particular, when the mean particle size of the main component particles is 1.5 μm as with Example 4, if making the mean particle size of the additive component particles 0.01 to 0.12 μm, a low VB defect rate and long relative life were obtained.

When the mean particle size of the main component particles was 0.8 (0.78) μm as with Example 3, if making the mean particle size of the additive component particles 0.01 to 0.12 μm, a low VB defect rate and long life were obtained.

When the mean particle size of the main component particles is 0.63 μm, it is learned that it is preferable to make the mean particle size of the additive component particles 0.01 to 0.31 μm as in Example 5, it is more preferable to make the mean particle size of the additive component particles 0.01 to 0.17 μm as in Examples 10 and 12, and it is more preferable to make the mean particle size of the additive component particles 0.01 to 0.12 μm as in Examples 1 and 6.

According to Examples 1 to 13, it is learned that when the particle size of the main component particles is the same, if making the particle size of the additive component particles smaller, there is a tendency for the VB defect rate to drop and the relative life to become lower.

As with Example 2, it is learned that when the mean particle size of the main component particles is 0.22 μm, if making the mean particle size of the additive component particles 0.01 to 0.04 μm, a low VB defect rate and long relative life can be obtained.

(Effects of Element of Additive Component Particles)

As will be understood from Table 2, Examples 1 to 5 including a Ca compound, Ba compound, and Mg compound belonging to the first group of elements (Ca, Sr, Ba, and Mg) (first compound), a Cr compound belonging to the second group of elements (V, Cr, and Mn) (second compound), an Si compound belonging to the third group of elements (Li, B, and Si) (third compound), and a Y compound belonging to the fourth group of elements (Ti, Zr, Y, Nb, Hf, Eu, Gd, Tb, Dy, Ho, Er, Tm, Yb, and Lu) (fourth compound) exhibited lower VB defect rates and longer relative lives.

As will be understood from Table 2, Examples 6 to 13 including a first compound including at least element selected from the first group of elements (Ca, Sr, Ba, and Mg), a second compound including at least one element selected from the second group of elements (V, Cr, and Mn), a third compound including at least one element selected from the third group of elements (Li, B, and Si), a 4-1st compound including at least one element selected from the 4-1st group of elements (Ti and Zr), and a 4-2nd compound including at least one or two or more elements selected from the 4-2nd group of elements (Y, Nb, Hf, Eu, Gd, Tb, Dy, Ho, Er, Tm, Yb, and Lu) exhibited low VB defect rates and long relative lives.

EXAMPLE 14

The method of production of the ceramic powder according to the present invention will be explained in detail next based on Example 14. The production steps are common with the steps shown in FIG. 3.

First, the main component was prepared (S1). As the main component, $BaTiO_3$ having a mean particle size of 0.6 μm was prepared.

The additive component was then prepared (S2). As the additive component, a Ba compound, Ca compound, Si compound, Y compound, Mg compound, Cr compound, and V compound were prepared.

The additive component was dissolved in a solvent to prepare a solution (S3). The solvent of the additive component was made methanol. Methanol was added to the above additive component to prepare a metal alkoxide solution of the additive component.

The amount of addition of the additive component dissolved in the solvent is determined so that the additive component becomes as follows: The amount of addition of the additive component particles was 2.19 parts by weight with respect to 100 parts by weight of the main component particles.

The composition of the additive component was as follows:

Converted to oxides of the additive component with respect to 100 parts by weight of the main component $BaTiO_3$:

$Y_2O_3$: 1.00 part by weight,
MgO: 0.30 part by weight,
$Cr_2O_3$: 0.14 part by weight,
$SiO_2$: 0.50 part by weight,
CaO: 0.20 parts by weight,
$V_2O_5$: 0.05 part by weight For the additive component, the metal alkoxide solutions of the following compositions were added in exactly the following amounts. Note that the following Ba is the barium component added as the additive component. The mol/L added below each compound of the additive component is the concentration of the compound of the additive component in the metal alkoxide solution. The amount of addition is the amount of the solution added to 100 g of the main component $BaTiO_3$.

The concentrations and the amounts of addition of the metal alkoxide solutions are shown below:

$Ba(C_5H_7O_2)_2$: barium bis (2,4-pentanedionite)
  Concentration: 0.65 mol/L, amount of addition: 850 ml
$Ca(C_5H_7O_2)_2$: calcium bis (2,4-pentanedionite)
  Concentration: 0.70 mol/L, amount of addition: 320 ml
$Si(OC_2H_5)_4$: tetraethoxysilane
  Concentration: 0.75 mol/L, amount of addition: 440 ml
$Y_2(C_2O_4)_3 \cdot 9H_2O$: yttrium oxalate
  Concentration: 0.50 mol/L, amount of addition: 1250 ml
$Mg(C_2O_4) \cdot 2H_2O$: magnesium oxalate
  Concentration: 0.71 mol/L, amount of addition: 1580 ml
$Cr(C_2O_4) \cdot 6H_2O$: chromium oxalate
  Concentration: 0.20 mol/L, amount of addition: 565 ml
$VO(C_5H_7O_2)_2$: vanadium bis (2,4-pentanedionite)oxide
  Concentration: 0.10 mol/L, amount of addition: 323 ml The above additive composition solutions were added to the main component in the following order, mixed, controlled in pH, and heat treated repeatedly (steps S1 to S7 shown in FIG. 3).

(1) The above concentrations of $Ba(C_5H_7O_2)_2$ and $Ca(C_5H_7O_2)_2$ were weighed in exactly the above amounts of addition with respect to 100 g of the main component particles, simultaneously added to the main component, mixed, and stirred. The solvent in the solution was vaporized and heated at 800° C. for 5 hours.

At this stage, the Ba compound and Ca compound of the additive component particles had deposited as oxides on the surface of the main component particles. Observing this state through a microscope, the Ba compound and Ca compound deposited on the surface of the main component particles so as to cover the surface of the main component particles.

(2) The above concentration of $Si(OC_2H_5)_4$ was added in the above amount of addition to the main component $BaTiO_3$ having the Ba compound and Ca oxide bonded to the surface, mixed, and stirred. The solvent in the solution was vaporized and heated at 800° C. for 5 hours.

At this stage, the Si compound of the additive component particles had deposited as an oxide on the surface of the main component particles. Observing this state through a microscope, the Si compound deposited on the surface of the main component particles so as to cover the surface of the main component particles.

(3) Further, $Y_2(C_2O_4)_3 \cdot 9H_2O$, $Mg(C_2O_4) \cdot 2H_2O$, $Cr(C_2O_4) \cdot 6H_2O$ were further simultaneously added in the above concentrations and amounts to the main component $BaTiO_3$ having the Ba compound, Ca compound, and Si compound deposited on it in this way, then mixed and stirred. Next, the solvent in the solution was vaporized and the result heat treated at 800° C. for 5 hours.

At this stage, the Y compound, Mg compound, and Cr compound of the additive component particles had deposited as oxides on the surfaces of the main component particles. Observing this state through a microscope, the Y compound, Mg compound, and Cr compound deposited on the surfaces of the main component particles so as to cover the surfaces of the main component particles.

(4) $VO(C_5H_7O_2)_2$ was further simultaneously added in the above concentrations and amounts to the main component $BaTiO_3$ having the Ba compound, Ca compound, Si compound, Y compound, Mg compound, and Cr compound bonded to its surface in this way, then mixed and stirred. Next, the solvent in the solution was vaporized and the result heat treated at 800° C. for 5 hours.

At this stage, the V compound of the additive component particles had deposited as an oxide on the surfaces of the main component particles. Observing this state through a microscope, the V compound deposited on the surfaces of the main component particles so as to cover the surfaces of the main component particles.

The composition of the obtained ceramic powder was as shown in the following formula 1 when no Si enters the perovskite.

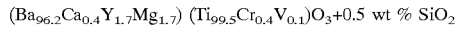

$(Ba_{96.2}Ca_{0.4}Y_{1.7}Mg_{1.7})(Ti_{99.5}Cr_{0.4}V_{0.1})O_3 + 0.5$ wt % $SiO_2$

In this embodiment, from the viewpoint of simplification of the steps, the technique was adopted of simultaneously adding a plurality of types of additive component solutions not reacting with each other. Of course, it is also possible to separately add and heat treat various additive component solutions and repeat the steps from addition of the additive component solutions to heat treatment (S4 to S7 shown in FIG. 3).

The thus prepared ceramic powder was used to fabricate a multilayer ceramic capacitor. The steps are common with S8 to S16 shown in FIG. 3.

The thus prepared multilayer ceramic capacitor of Example 14 had a thickness of its internal electrodes of 1.5

μm, a thickness of dielectric layers between internal electrodes of 3.0 μm, and a number of stacked dielectric layers of 309 layers. The outside dimensions of the product were 3.2 mm×1.6 mm×1.6 mm.

application of a 20V DC voltage in an air atmosphere of 200° C. The breakage voltage was tested by gradually raising the voltage applied to the capacitors and investigating the breakdown voltage where a short-circuit occurs.

TABLE 3

|  | Method of dispersion of additive components | Heat treatment conditions of additive components | Primary particle size of additive components | permittivity | Accelerated life of high temperature load test (hr) | Mean breakdown voltage (V/μm) |
|---|---|---|---|---|---|---|
| Ex. 14 | Coating | — | 0.050 | 3900 | 112 | 120 |
| Comp. Ex. 3 | Mixing and dispersion | Roasting | 0.500 | 3000 | 5 | 75 |
|  |  |  | 0.150 | 3000 | 15 | 83 |
| Comp. Ex. 4 | Mixing and dispersion | Plasma | 0.300 | 3100 | 16 | 80 |
|  |  |  | 0.150 | 3050 | 31 | 87 |
|  |  |  | 0.050 | 3100 | 88 | 98 |

Comparative Example 3

In Comparative Example 4, the roasting method was used to prepare a ceramic powder. That is, as the additive components, $BaCO_3$, $CaCO_3$, $SiO_2$, $Y_2O_3$, $MgCO_3$, $Cr_2O_3$, and $V_2O_5$ were weighed and combined, then added with water, mixed, and pulverized. The pulverized slurry was dried by hot air by a batch furnace, then roasted. Next, the result was wet pulverized, then dehydrated and dried. Particles having mean particle sizes of 0.5 μm and 0.15 μm were obtained. These granules were directly mixed into a main component comprised of the $BaTiO_3$. The same procedure was followed as in the embodiment for the rest of the steps to fabricate a multilayer ceramic capacitor of similar dimensions.

Comparative Example 4

In Comparative Example 4, the plasma method was used to prepare an additive component powder. That is, as the compounds of the additive component, $BaCO_3$, $CaCO_3$, $SiO_2$, $Y_2O_3$, $MgCO_3$, $Cr_2O_3$, and $V_2O_5$ were weighed and combined, then wet mixed and pulverized by a ball mill using an organic solvent as a dispersant, dehydrated, then dried by hot air to obtain granules.

Specifically, the plasma treatment apparatus shown in Japanese Unexamined Patent Publication (Koukai) No. 10-270284 was used to generate heat by high frequency, granules were introduced into the plasma produced, and the gas flow of the additive components was rapidly cooled. By changing the cooling speed, additive components having mean particle sizes of 0.30 μm, 0.15 μm, and 0.05 μm were obtained. The results were wet pulverized, then freeze-dried. The granules were directly mixed into a main component comprised of $BaTiO_3$. The same procedure was followed as in the embodiment for the rest of the steps to fabricate multilayer ceramic capacitors of similar dimensions.

(Short-Circuit Defect Rate Test, High Temperature Accelerated Life Test, and Mean Breakage Voltage Test) The multilayer ceramic capacitors of Example 14, Comparative Example 3, and Comparative Example 4 were measured for permittivitys and evaluated by high temperature accelerated lives and mean breakage voltages. The results are shown in Table 3.

The permittivity was measured by an HP 4284 LCR meter under measurement conditions of 1 kHz and 1 Vrms. The high temperature accelerated life was tested by continuous As clear from Table 3, Example 14 exhibits a higher permittivity, longer accelerated life in a high temperature load test, and higher breakdown voltage compared with any of the comparative examples.

According to the present invention, it is possible to improve the dispersibility of particles of the additive component and make the composition uniform, so it is possible to suppress the occurrence of hetero phases in ceramic powder. By using the ceramic particles, it is possible to obtain a multilayer ceramic capacitor or other multilayer ceramic electronic device having a high breakdown voltage and long life even with a thickness of dielectric layers of not more than 3 μm or further not more than 2 μm.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2002-076512, filed on Mar. 19, 2002, the disclosure of which is expressly incorporated herein by reference in its entirety.

What is claimed is:

1. A ceramic powder including ceramic main component particles and additive component particles, wherein:
    a content of said additive component particles with respect to 100 parts by weight of said ceramic powder is 0.1 to 5 wt%,
    a mean particle size of said main component particles is 0.1 to 1.5 μm,
    a mean particle size of said additive component particles is 0.01 to 0.31 μm, and
    said additive component particles are deposited on the surfaces of said ceramic main component particles.

2. The ceramic powder as set forth in claim 1, wherein the content of the additive component particles with respect to 100 parts by weight of the ceramic powder is 1.95 to 3.48 wt%.

3. The ceramic powder as set forth in claim 1, wherein the content of the additive component particles with respect to 100 parts by weight of the ceramic powder is 2.2 to 3.31 wt%.

4. The ceramic powder as set forth in claim 1, wherein the content of the additive component particles with respect to 100 parts by weight of the ceramic powder is 2.2 to 2.8 wt%.

5. The ceramic powder as set forth in claim 1, wherein the mean particle size of said main component particles is 0.1 to 0.8 μm.

6. The ceramic powder as set forth in claim 1, wherein the mean particle size of said main component particles is 0.1 to 0.63 μm.

7. The ceramic powder as set forth in claim 1, wherein the mean particle size of said main component particles is 0.1 to 0.22 μm.

8. The ceramic powder as set forth in claim 1, wherein the mean particle size of said additive component particles is 0.01 to 0.17 μm.

9. The ceramic powder as set forth in claim 1, wherein the mean particle size of said additive component particles is 0.01 to 0.12 μm.

10. The ceramic powder as set forth in claim 1, wherein the mean particle size of said additive component particles is 0.01 to 0.04 μm.

11. The ceramic powder as set forth in claim 1, wherein said main component particles include $BaTiO_3$.

12. The ceramic powder as set forth in claim 1, wherein said additive component particles include at least a compound imparting resistance to reduction.

13. The ceramic powder as set forth in claim 12, wherein said additive component particles include at least one a Ca compound, Sr compound, Ba compound, Mg compound, V compound, Cr compound, Mn compound, Li compound, B compound, Si compound. Ti compound, Zr compound, Y compound, Nb compound, Hf compound, Eu compound, Gd compound, Tb compound, Dy compound, Ho compound, Er compound, Tm compound, Yb compound, and Lu compound.

14. The ceramic powder as set forth in claim 12, wherein said additive component particles include at least:

a first compound including at least one element selected from a first group of elements (Ca, Sr, Ba, and Mg), a second compound including at least one element selected from a second group of elements (V, Cr, and Mn), a third compound including at least one element selected from a third group of elements (Li, B, and Si), and a fourth compound including at least one element selected from a fourth group of elements (Ti, Zr, Y, Nb, Hf, Eu, Gd, Tb, Dy, Ho, Er, Tm, Yb, and Lu).

15. The ceramic powder as set forth in claim 12, wherein said additive component particles include:

a first compound including at least one element selected from a first group of elements (Ca, Sr, Ba, and Mg), a second compound including at least one element selected from a second group of elements (V, Cr, and Mn), a third compound including at least one element selected from a third group of elements (Li, B, and Si), a 4-1st compound including at least one element selected from a 4-1st group of elements (Ti and Zr), and a 4-2nd compound including at least one element selected from a 4-2nd group of elements (Y, Nb, Hf, Eu, Gd, Tb, Dy, Ho, Er, Tm, Yb, and Lu).

16. A method of ProducinE a multilayer ceramic electronic device, comprising the steps:

forming a green sheet of a dielectric layer from the ceramic powder as set forth in claim 1; and producing an element body comprising dielectric layers by stacking and pressing a plurality of the green sheets.

17. The method of producing a multilayer ceramic electronic device as set forth in claim 16, wherein each thickness of said dielectric layers is 0.01 to 3 μm.

18. The method of producing a multilayer ceramic electronic device as set forth in claim 16, wherein each thickness of said dielectric layers is 0.01 to 2 μm.

19. A method of producing a multilayer ceramic electronic device, comprising the steps:

forming a green sheet of a dielectric layer using the ceramic powder as set forth in claim 12; and producing an element body comprising dielectric layers by stacking and pressing a plurality of the green sheets.

* * * * *